United States Patent
Chang et al.

(10) Patent No.: US 11,800,417 B2
(45) Date of Patent: Oct. 24, 2023

(54) CELL RESELECTION IN COMMUNICATION SYSTEMS USING UNLICENSED FREQUENCY BANDS

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 6 days.

(21) Appl. No.: 17/277,477

(22) PCT Filed: Sep. 10, 2019

(86) PCT No.: PCT/US2019/050325
§ 371 (c)(1),
(2) Date: Mar. 18, 2021

(87) PCT Pub. No.: WO2020/068410
PCT Pub. Date: Apr. 2, 2020

(65) Prior Publication Data
US 2021/0352542 A1    Nov. 11, 2021

Related U.S. Application Data (60) Provisional application No. 62/737,513, filed on Sep. 27, 2018.

(51) Int. Cl.
*H04W 48/18* (2009.01)
*H04W 36/00* (2009.01)

(52) U.S. Cl.
CPC . *H04W 36/00835* (2018.08); *H04W 36/0072* (2013.01); *H04W 36/00837* (2018.08); *H04W 36/0069* (2018.08)

(58) Field of Classification Search
CPC ..... H04W 48/20; H04W 16/16; H04W 72/06; H04W 72/10
See application file for complete search history.

(56) References Cited

U.S. PATENT DOCUMENTS

| | | |
|---|---|---|
| 9,756,611 B2 | 9/2017 | Yavuz et al. |
| 2016/0212629 A1 | 7/2016 | Wei et al. |
| 2016/0337931 A1* | 11/2016 | Wang ............ H04W 4/70 |
| 2018/0192365 A1 | 7/2018 | Feng |
| 2020/0396619 A1* | 12/2020 | Kim ............ H04W 48/20 |

FOREIGN PATENT DOCUMENTS

| | | | |
|---|---|---|---|
| CN | 107466058 A * | 12/2017 | ........ H04W 24/02 |
| WO | 2017/167746 A1 | 10/2017 | |

OTHER PUBLICATIONS

LG Electronics Inc.; "Cell Reselection in NR-U," R2-1812828; 3GPP TSG-RAN WG2 #103; Aug. 10, 2018; Gothenburg, SE.

* cited by examiner

*Primary Examiner* — Charles N Appiah
*Assistant Examiner* — Dung L Lam (57) ABSTRACT

Cell selection in a New Radio-Unlicensed Standalone (NR-U SA) communication system is managed by allowing UE devices to avoid measurements of frequencies that are occupied. A base station (gNB) may indicate to the UE device frequencies that can be skipped or may allow the UE device to skip frequencies for a temporary period after the frequencies have been determined to be occupied.

12 Claims, 6 Drawing Sheets

CELL RESELECTION IN COMMUNICATION SYSTEMS USING UNLICENSED FREQUENCY BANDS

CLAIM OF PRIORITY

The present application claims the benefit of priority to Provisional Application No. 62/737,513, entitled "Method for selection and reselection in a New Radio—Unlicensed network", docket number TPRO 00326 US, filed Sep. 27, 2018, assigned to the assignee hereof and hereby expressly incorporated by reference in its entirety.

FIELD

This invention generally relates to wireless communications and more particularly to cell reselection in communication systems using unlicensed frequency bands.

BACKGROUND

Wireless technologies, such as WiFi and Bluetooth, utilize unlicensed frequency bands for communication. In the United States, the unlicensed bands are located in at least the 900 MHz, 2.4 GHz and 5.8 GHz frequency bands. Some communication technologies that have traditionally operated within licensed frequency bands are beginning to use unlicensed bands for some communication. For example, the 3rd Generation Partnership Project (3GPP) has developed Licensed-Assisted Aggregation (LAA) to make use of the free unlicensed bands in conjunction with the licensed band. LAA is very similar to Carrier Aggregation (CA) whereby user equipment (UE) devices can simultaneously access multiple cells at the same time using a primary cell (PCell) and a secondary cell (SCell). The SCell which is typically a small cell, handles much of the broadband load and the PCell which is typically a macro-cell, handles the control signaling. The UE devices do not experience unnecessary increase in handover failures when moving from one small cell to another. As long as the UE device remains connected to the PCell (typically a macro-cell), the UE devices do not declare handover failure even if the connection to the SCell is lost. LAA is designed for fair coexistence among LAA networks deployed by different operators and other non-3GPP technologies. AS a result, 3GPP requires a listen-before-talk (LBT) procedure which is defined as a mechanism by which an equipment applies a clear channel assessment (CCA) check or LBT check before using the unlicensed channel.

A newly developing technology studied by the 3GPP and referred to as New Radio-Unlicensed Standalone (NR-U SA) proposes an NR-based cell operating standalone in unlicensed spectrum and connected to a 5G core network (5G-CN) with priority on frequency bands above 6 GHz. With this system, there is no longer an anchor cell (PCell) that is transmitting in a licensed band. As a result, control signaling for mobility is performed over unlicensed bands.

The NR-U SA systems require that a UE device verifies that the channel quality to their serving cell be above a minimum and that the UE device search for another cell if the quality is below the minimum. When the UE device, for example, is in IDLE mode, it receives signals from a serving cell to maintain connectivity to the network. The UE device "camps" on the cell and is notified of an incoming call by a paging message. The network manages which cells are used by the UE devices for camping and provides criteria that determines when each UE device should look for another cell. The process in looking for another cell is often referred to as cell reselection. Networks often prioritize the frequencies for selection and reselection. Therefore, a UE device camped on a particular cell is often required to reselect a new cell that is of higher priority in order that the UE devices are camped on the highest priority frequency available. The potential cells for camping and/or providing other service includes cells includes cells operating within more than one radio access technology (RAT). As a result, the reselection process may define cell reselection for inter-RAT transitions. Cell reselection includes inter-frequency transitions and intra-frequency transitions within the same RAT. The inter-RAT and inter-frequency transitions are often referred to as being non-intra-frequency. The network may distribute UE devices over several cells and prioritize unlicensed frequencies for camping. Therefore, the UE device is provided a list of frequencies that are prioritized where the UE device selects and reselects based on the list and signal quality thresholds. As a result, in order to reselect a cell, the UE device performs measurements of signals transmitted in nearby cells.

SUMMARY

Cell selection in a New Radio-Unlicensed Standalone (NR-U SA) communication system is managed by allowing UE devices to avoid measurements of frequencies that are occupied. A base station (gNB) may indicate to the UE device frequencies that can be skipped or may allow the UE device to skip frequencies for a temporary period after the frequencies have been determined to be occupied.

DETAILED DESCRIPTION

As discussed above, in a NR-U SA system, each UE device selects a cell to camp on based on signal quality thresholds and list of prioritized frequencies where at least some of the frequencies are in an unlicensed band. Since the unlicensed band may be occupied and the UE device and base station (gNB) must perform LBT procedures prior to any transmission, the base station (gNB) may not be able to transmit reference signals for the UE device to measure. As a result, in conventional systems, the UE device wastes power by attempting to measure channels that are occupied. For the examples discussed herein, however, the UE devices avoid measuring frequencies that are occupied. In one example, the serving base station (gNB) informs the UE device that some frequencies are temporary unavailable. The gNB identifies occupied frequencies where the cell will not be transmitting any reference signals for the UE to perform measurements. In another example, the base station (gNB) instructs, or otherwise configures, the UE device to skip measurements on higher priority frequencies for a time period. The time period may begin on any of several different events. For example, the time period may begin when the UE device is notified by the base station. The time period may also be set to begin when the UE device measures a high priority frequency and determines the channel is occupied.

For the examples herein, certain frequencies are prioritized as a higher priority than other frequencies. During cell reselection, the UE device is required to search for higher priority frequencies under particular circumstances. In one example, an NR-based cell operating standalone in unlicensed spectrum is connected to a 5G-CN network with priority on frequency bands above 6 GHz. In certain situations, it may be preferable to have some UE devices camp on one of the unlicensed bands to relieve congestion on the licensed band. In other examples, it may be preferable to distribute the communication load over unlicensed bands. Currently, for at least one communication standard, the measurement rules for UE devices in IDLE/Inactivity requires that the UE device performs measurements of higher priority NR inter-frequency bands even if the serving cell fulfils threshold criteria based on Reference Signals Received Power (RSRP) and Reference Signal Received Quality (RSRQ). For example, in accordance with 3GPP TS 38.304, a UE device in IDLE/Inactivity performs measurements of higher priority NR inter-frequency bands even if the serving cell fulfils $Srxlev > S_{IntraSearchP}$ and $Squal > S_{IntraSearchQ}$ where $S_{IntraSearchP}$ specifies the Srxlev threshold (in dB) for intra-frequency measurements and $S_{IntrasearchQ}$ specifies the Squal threshold (in dB) for intra-frequency measurements. The "P" at the end of the threshold term refers to RSRP whereas the "Q" at the end correspond to RSRQ. However, if a higher priority unlicensed frequency is occupied after LBT check, the UE device will not be able to camp on the frequency since the cell or base station will not be able to transmit the reference signals used by the UE to determine a cell's signal strength if the frequency channel is occupied. In another case, due to the "hidden node" scenario, the base station does not sense the channel occupancy that is experienced on the UE side and the UE may be able to camp on the frequency but it still will be unable to transmit after LBT check.

The 3GPP TS 38.304 standard also specifies the criteria for searching for non-intra-frequencies that include inter-frequencies and inter-RAT frequencies. If the $Srxlev > S_{nonIntraSearchP}$ and $Squal > S_{nonIntraSearchQ}$ criteria is met, the UE device shall search for inter-frequency layers of higher priority at least every minimum search time ($T_{higher\_priority\_search}$). If $Srxlev < S_{nonIntraSearchP}$ or $Squal < S_{nonIntraSearchQ}$ (e.g., due to LBT failure for reference signal transmissions at the cell), the UE device would need to perform higher priority inter-frequency searches more frequently since the UE device's current cell may not be available for camping on many occasions due to LBT failure. In such cases, it will be preferable for the UE to continue to camp on the less prioritized frequency without performing measurements on the higher priority frequency that is occupied to conserve power. As discussed herein, the cell reselection is managed to minimize measurement of occupied unlicensed frequencies.

Figure 1:
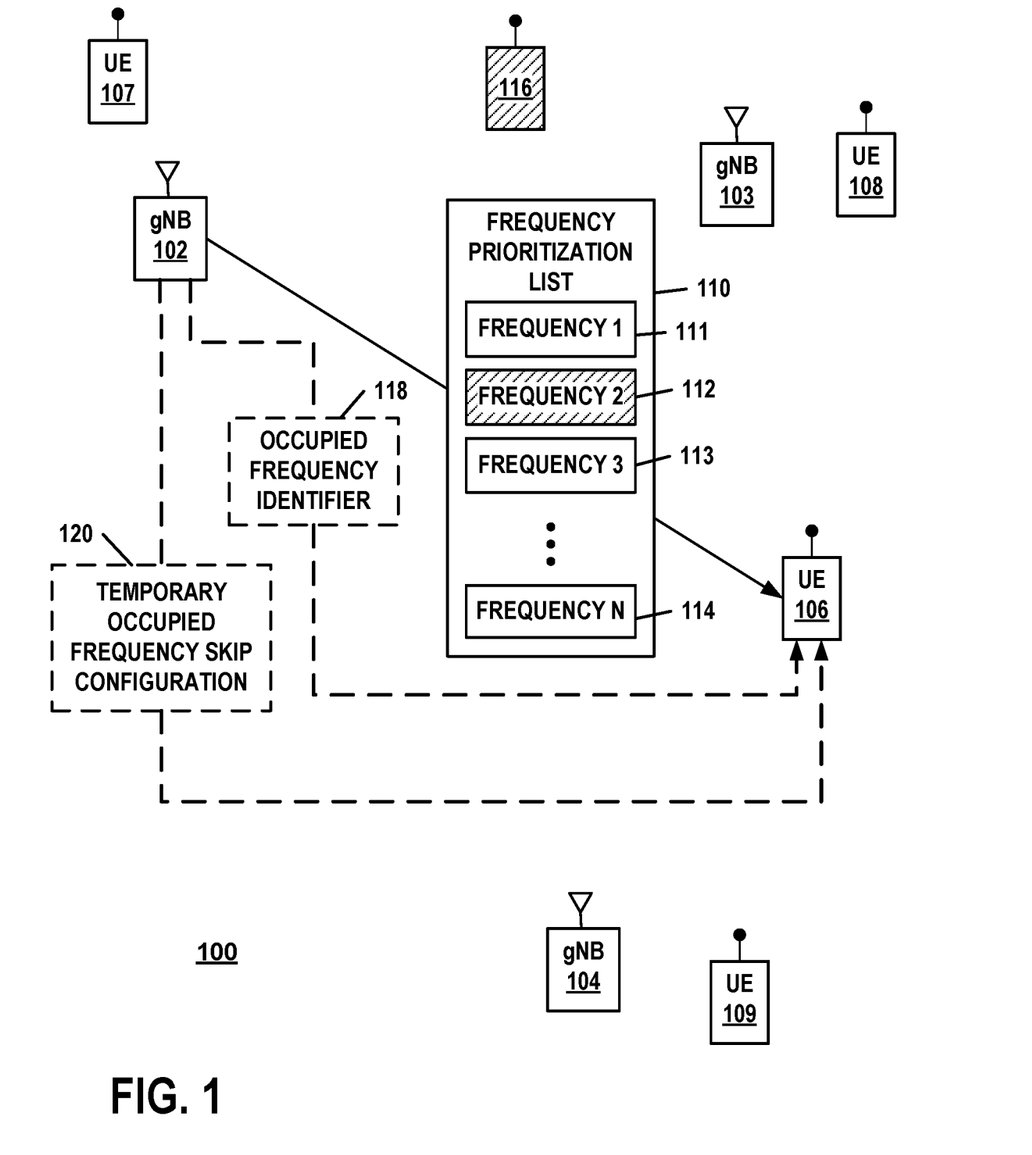
FIG. 1 is a block diagram of an example of a communication system supporting operation in accordance with 3GPP New Radio-Unlicensed Standalone (NR-U SA) with dynamic cell reselection management.

FIG. 1 is a block diagram of an example of a communication system 100 supporting operation in accordance with 3GPP New Radio-Unlicensed Standalone (NR-U SA) with dynamic cell reselection management. The communication system 100, therefore, may operate in accordance with one or more revisions of the 3GPP NR-U SA communication specification and includes mechanisms for efficiently managing cell reselection using unlicensed channels. The communication system 100 includes a plurality of base stations 102-104 providing wireless service to UE devices 106-109 within coverage areas that may overlap. The UE devices 106-108 communicate with the base stations in one or more unlicensed frequency bands. In some case, one or more unlicensed frequency channels belonging to the same or different bands may be used at each of the based stations 102-104. Furthermore, the unlicensed frequency channels may be provided to each UE device simultaneously using carrier aggregation. Therefore, the UE devices 106-108 transmit uplink signals in an unlicensed frequency band and receive downlink signals in an unlicensed frequency band. Typically, the same unlicensed frequency band is used for uplink and downlink although different bands can be used in some situations. An unlicensed frequency band is any frequency band that does not require the operator to file directly with a governmental agency regulating frequency spectrum, such as the Federal Communications Commission (FCC), in order to use the band. Examples of unlicensed frequency bands U.S. include the 900 MHz, 2.4 GHz and 5.8 GHz. Currently developing systems contemplate using at least the 6 GHz band which in the U.S. ranges between 5925 MHz and 7125 MHz and between 5925 MHz and 6425 MHz, in Europe. Portions of bands can also be used. The range 5150-5925 MHz, or parts thereof, is potentially available for license-assisted access to unlicensed operation bands. This frequency range can be operated under a license-exempt regime or ISM but must be shared with existing mobile services and other incumbent services. The quality of service offered by a licensed regime, therefore, cannot be matched. Hence, unlicensed access is viewed as complementary, and does not reduce the need for additional allocations for licensed operation in view of the increased demand for wireless broadband access. Other unlicensed frequency bands and portions of frequency bands can also be used. For the examples, herein, operation in the unlicensed frequency bands requires listen-before-talk (LBT) where a transmitting device must observe a channel to determine that is not in use before transmitting in that channel.

For the examples, the UE devices may also operate in licensed frequency bands. Therefore, in some situations, additional base stations may provide wireless communication service in a licensed frequency where a UE device may transition between using a licensed frequency band and an unlicensed frequency band. The UE devices for the examples herein may also operate using different radio access technologies (RATs) in licensed and unlicensed bands.

The base stations 102-104 are any transceivers that provide wireless service in a coverage area and can perform the functions described herein. The base stations 102-104 may be referred to as access points, access nodes, transceiver nodes, eNodeB, eNB, gNB and other terms depending on the particular system and application. For the example, the base stations 102-104 are in communication with each other through a backhaul which may include wired and/or wireless portions.

For the example of FIG. 1, a UE device 106 is being served by a serving base station (serving gNB) 102 where the serving base station manages the channel assessment procedures of the UE device 106. The serving base station (serving gNB) 102 provides the UE device 106 with a prioritized list 110 of frequencies where the UE device 106 performs cell reselection in accordance with the list 110 and criteria. The block representing the prioritized list 110 shows blocks 111-114 representing the frequencies where the frequency blocks are arranged in descending order of priority from 1 to N. Any number of frequencies may be included and various techniques may be used to convey the frequencies and priorities. In one example, the information is conveyed in a system information block (SIB) in accordance with at least one revision of the 3GPP NR-U SA communication specification. In another example, the frequencies priorities may be configured via dedicated signaling (e.g., RRC Release Message) to the UE just before the UE transitions to IDLE or INACTIVE. In a conventional system, the frequency priorities configured to the UE via dedicated signaling overrides the priorities configured via SIB. Therefore, it is particularly advantageous to assist the UE device with refraining from unnecessary measurement on an occupied frequency. This may be especially relevant where the occupied frequency is a highest priority frequency configured to the UE device via dedicated signaling. In this situation, with conventional means, changes to the frequency priorities via SIB signaling cannot override the UE's configured dedicated signaling. Furthermore, an updated dedicated signaling cannot be sent to the UE once the UE has already transitioned to IDLE or INACTIVE.

Therefore, complications arising from the fact that SIB signaling cannot override dedicated signaling are avoided in at least one example discussed herein. In addition, the gNB probably typically will not know whether an unlicensed frequency will become occupied when it configures the frequency priorities via dedicated signaling just before releasing the UE to IDLE/INACTIVE. If the UE device were only to receive frequency priorities via SIB then it may be possible for the gNB to make changes to the frequency priorities when it finds out that one of them is occupied without the techniques discussed herein. However, in many situations the gNB manages the dedicated frequency priorities to avoid scenarios where all the UE devices to camp on the same frequency. In such scenarios, network congestion issues may occur where all the UE devices attempt to originate a call at the same time on the same frequency (e.g., during an emergency situation). Since SIB signaling applies to all UE devices, frequency differentiation among UE devices cannot be done with SIB and dedicated frequency priority is needed to manage network congestion.

For the situation in FIG. 1, frequency 2 110 is occupied because a transmitting device 116 is transmitting on the frequency. The transmitting device 116 may be a UE device, a base station within the communication system 100, a base station not part of the network, or may be any other device that is using the unlicensed frequency band. In accordance with the example, the UE device 106 avoids measuring frequency 2 that is occupied during cell reselection. In one example, the serving base station (gNB) 102 informs the UE device 106 that some frequencies are temporary unavailable. The gNB identifies occupied frequencies with an occupied frequency identifier 118 where the cell will not be transmitting any reference signals for the UE device to perform measurements. In another example, the base station (gNB) instructs, or otherwise configures, the UE device 106 to skip measurements on higher priority frequencies for a time period. The configuration or instruction is represented with the temporary occupied frequency skip configuration 120. The occupied frequency identifier 118 and the temporary occupied frequency skip configuration 120 are represented with dashed lines in FIG. 1 to indicate that, depending on the particular implementation, only one of the two may be implemented. In some situations, the gNB may be able to utilize either of the techniques. In other situations, both mechanisms may be invoked.

Figure 2:
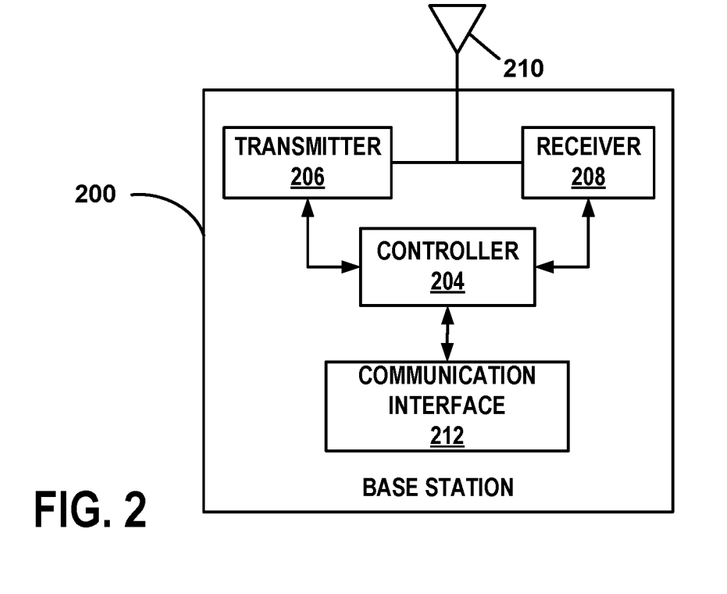
FIG. 2 is a block diagram of an example of a base station suitable for use as each of the base stations.

FIG. 2 is a block diagram of an example of a base station 200 suitable for use as each of the base stations 102-104. The base station 200 includes a controller 204, transmitter 206, and receiver 208, as well as other electronics, hardware, and code. The base station 100 is any fixed, mobile, or portable equipment that performs the functions described herein. The various functions and operations of the blocks described with reference to the base stations 102-104, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location. Accordingly, the base station 200 may be a portable user device such as a communication device in some circumstances. Although the base station may be referred to by different terms, the base station is typically referred to as a gNodeB or gNB when operating in accordance with one or more communication specifications of the 3GPP directed to (NR-U SA) operation.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

For the example, the base station 200 includes a communication interface 212 for transmitting and receiving messages with other base stations. The communication interface 212 may be connected to a backhaul or network enabling communication with other base stations. In some situations, the link 116 between the base stations 112, 114 may include at least some wireless portions. The communication interface 212, therefore, may include wireless communication functionality and may utilize some of the components of the transmitter 206 and/or receiver 208.

The base station 200 has the capability to observe one or more downlink channels to determine if the channel is currently occupied. In other words, the base station 200 can determine whether other devices are transmitting within the channel. For the examples herein, the receiver 208 detects energy within the channel and the controller makes a determination of whether the measured energy indicates the channel is in use. For example, the measured energy can be compared to a threshold. Other techniques can be used in some circumstances.

Figure 3:
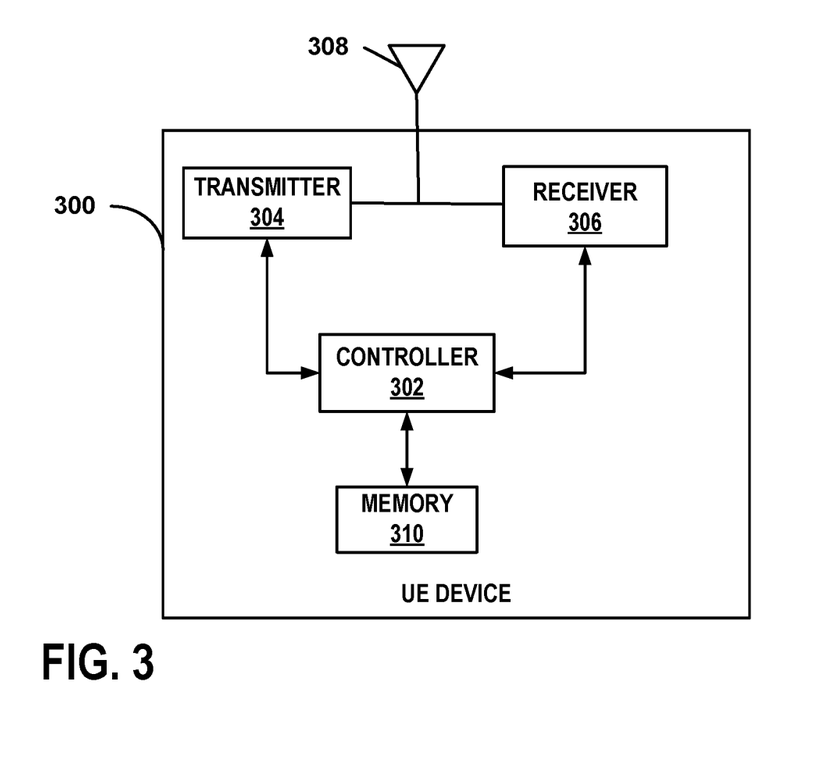
FIG. 3 is a block diagram of an example of a UE communication device suitable for use as each of the communication devices of FIG. 1.

FIG. 3 is a block diagram of an example of a UE communication device 300 suitable for use as each of the communication device 106-109 of FIG. 1. In some examples, the communication device 300 is any wireless communication device such as a mobile phone, a transceiver modem, a personal digital assistant (PDA), a tablet, or a smartphone. In other examples, the communication device 300 is a machine type communication (MTC) communication device or Internet-of-Things (IOT) device. The communication device 300, (106-109), therefore is any fixed, mobile, or portable equipment that performs the functions described herein. The various functions and operations of the blocks described with reference to communication device 300 may be implemented in any number of devices, circuits, or elements. Two or more of the functional blocks may be integrated in a single device, and the functions described as performed in any single device may be implemented over several devices.

The communication device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

The UE communication device 300 has the capability to observe one or more uplink channels to determine if the channel is currently occupied. In other words, the UE communication device 300 can determine whether other devices are transmitting within the channel. For the examples herein, the receiver 304 detects energy within the channel and the controller makes a determination of whether the measured energy indicates the channel is in use. For example, the measured energy can be compared to a threshold. Other techniques can be used in some circumstances.

Figure 4:
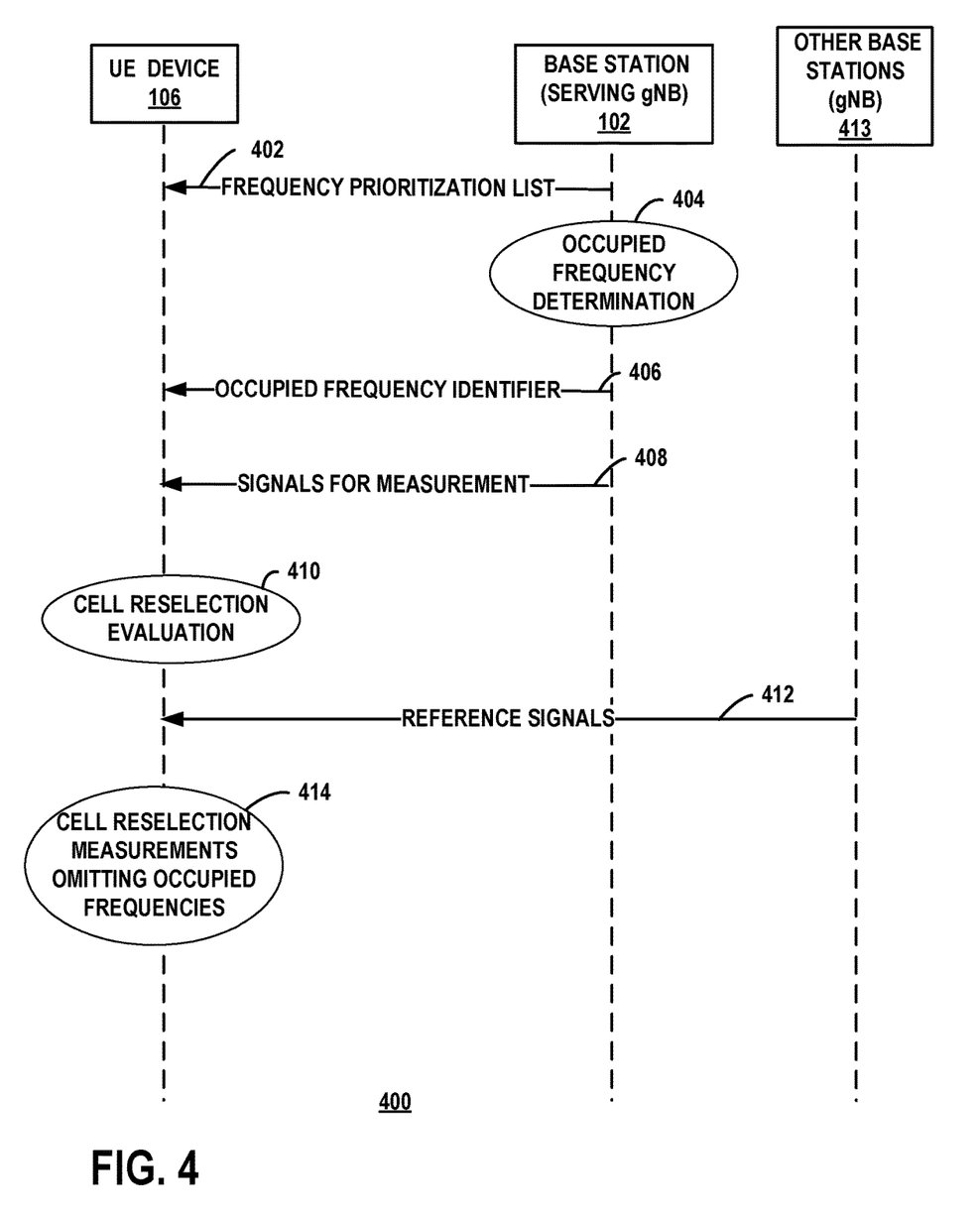
FIG. 4 is a timing diagram 400 of communication for an example where a UE device does not measure occupied frequencies identified by the serving base station in a communication system utilizing unlicensed frequency bands for transmission.

FIG. 4 is a timing diagram 400 of communication for an example where a UE device does not measure occupied frequencies identified by the serving base station in a communication system utilizing unlicensed frequency bands for transmission. The example of FIG. 4 begins with the UE device 106 in IDLE/INACTIVE mode and camped on the cell of the serving base station. The timing diagram, therefore, is an example of transmissions and events that can be performed by the system 100 discussed above.

At transmission 402, the serving base station (gNB) 102 transmits a frequency prioritization list 110. The frequency prioritization list 110 identifies the frequencies and priorities the UE device should follow for cell selection/reselection. For the example, the frequency prioritization list 110 is transmitted over a SIB in accordance with at least one revision of the 3GPP NR-U SA communication specification. In another example, the frequency prioritization list may be optionally configured to the UE via dedicated signaling (e.g., RRC Release Message) before the UE transitions to IDLE or INACTIVE.

At event 404, the serving base station 102 identifies unlicensed frequencies that are occupied. The base station 102 measures parameters of at least each unlicensed frequency in the frequency prioritization list to determine the channel occupancy level. The base station 102 may determine, for example, whether the level of measured energy in the channel is above a threshold.

At transmission 406, the serving base station 102 sends the occupied frequency identifier 118 to the UE device 106. The occupied frequency identifier 118 includes a list of occupied unlicensed frequencies including at least one frequency (blacklist). For the example, the occupied frequency identifier 118 is transmitted in a SIB. Alternatively, the serving base station 102 may include frequency identifier with a list of non-occupied unlicensed frequencies (whitelist) not depicted in FIG. 4.

Although the timing diagram shows a single transmission of the occupied frequency identifier, in some situations the occupied frequency identifier is updated and transmitted at other times during the timing of the events and transmissions discussed herein.

Signals, such as reference signals (including CSI-RS) and DMRS, are evaluated for cell reselection criteria are transmitted at transmission 408 from the serving base station. The signals are evaluated by the UE device 106 at event 410 to determine if cell reselection is required. For example, the UE device may determine whether the serving cell fulfilling the Srxlev>$S_{IntraSearchP}$ and Squal>$S_{IntraSearchQ}$ requirements as well as determining whether there is a higher priority frequency provided in the frequency prioritization list and that is being used by a nearby cell.

At transmission 412, the reference signals are transmitted by nearby base stations 413. Since the reference signals are transmitted at unlicensed frequencies, the base stations perform LBT check before transmission. As a result, no reference signals are transmitted over frequencies identified by the serving base station 102 as occupied.

At event 414, the UE device 106 performs reselection measurements of frequencies not identified as occupied. Therefore, the received referenced signals are measured but no attempts are made to measure the frequencies identified in the occupied frequency identifier 118.

Figure 5:
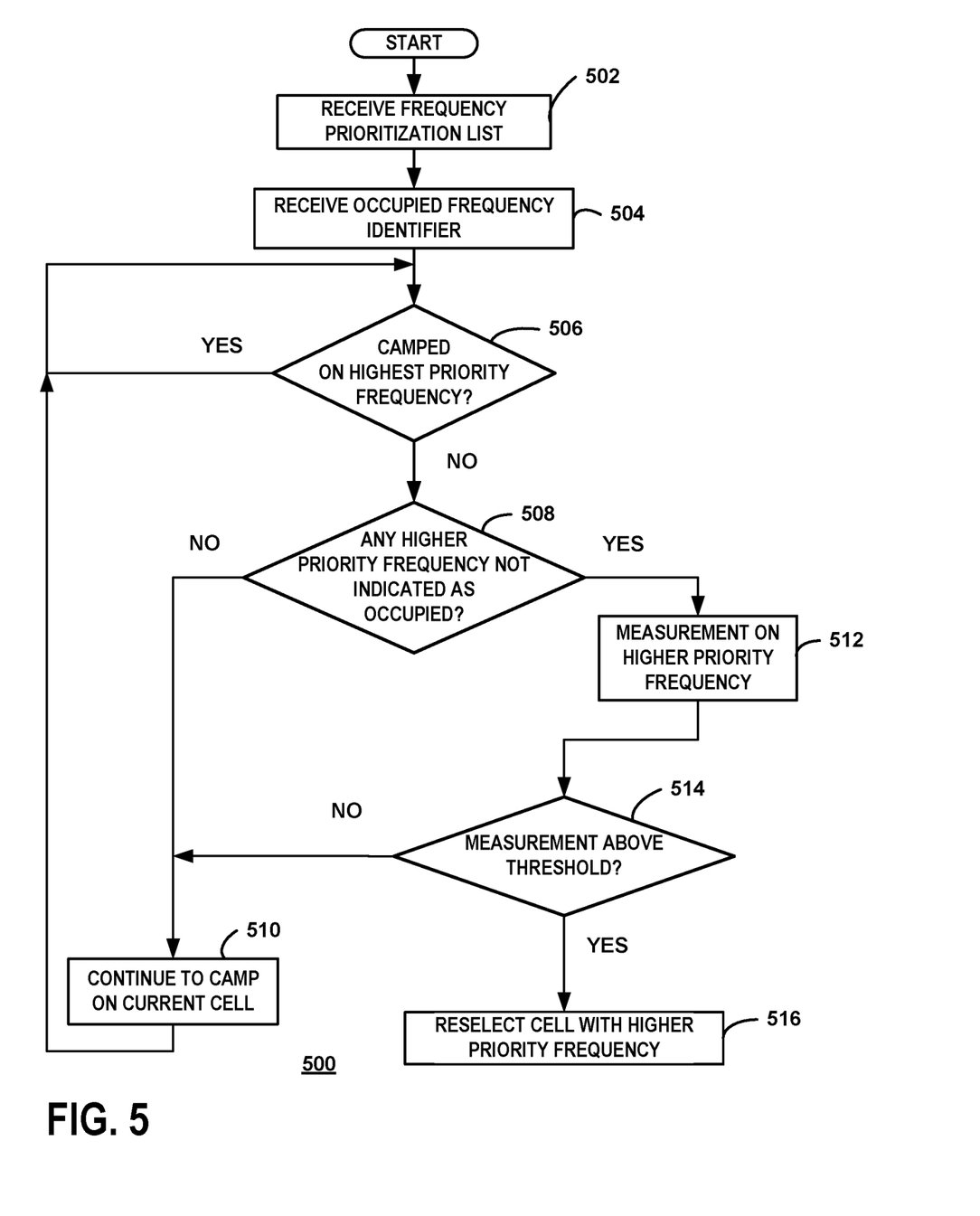
FIG. 5 is a flow chart of an example of a method of a cell reselection where occupied frequencies are not measured.

FIG. 5 is a flow chart of an example of a method of a cell reselection where occupied frequencies are not measured. The method is performed by a UE device operating in a NR-U SA system such as the system 100 described above. Accordingly, the method may be performed by the UE device 106. The example of FIG. 5 begins with the UE device 106 in IDLE/INACTIVE mode and camped on the cell of the serving base station.

At step 502, the frequency prioritization list 110 is received from the serving base station (gNB) 102. The frequency prioritization list 110 identifies the frequencies and priorities the UE device 106 should follow for cell selection/reselection. For the example, the frequency prioritization list 110 is received over a SIB in accordance with at least one revision of the 3GPP NR-U SA communication specification. In another example, the frequency prioritization list may be optionally configured to the UE via dedicated signaling (e.g., RRC Release Message) before the UE transitions to IDLE or INACTIVE.

At step 504, a frequency identifier 118 is received. The occupied frequency identifier 118 includes a list of occupied unlicensed frequencies including at least one frequency. The serving base station 102 identifies unlicensed frequencies that are occupied. The base station 102 measures parameters of at least each unlicensed frequency in the frequency prioritization list to determine the channel occupancy level. The base station 102 may determine, for example, whether the level of measured energy in the channel is above a threshold. For the example, the occupied frequency identifier 118 is transmitted in a SIB. Although the method shows a single reception of the occupied frequency identifier, in some situations, the occupied frequency identifier is updated and transmitted at other times during the method.

At step 506, it is determined whether the UE device is camped on the highest priority frequency. The UE device 106 determines whether a higher priority frequency is listed in the frequency prioritization list 110 or whether the UE device is camped on the highest priority frequency in the list. If the current frequency is the highest priority, the UE device continues to receive and monitor updated frequency prioritization lists. If the current frequency is not the higher priority, the method continues at step 508.

At step 508, it is determined whether any higher priority frequencies are not indicated as occupied. The UE device, determines whether higher priority frequencies are listed in the occupied frequency identifier 118. If no higher priority frequency is indicated based on the received occupied frequency identifier 118, UE device continues to camp on the current cell at step 510 and returns to step 506. If a higher priority frequency is unoccupied, the method continues to step 512.

At step 512, the higher priority frequency is measured. The UE device 106 evaluates parameters of the received reference signals transmitted at the higher priority frequency.

At step 514, it is determined whether the measurement is above the threshold requiring cell reselection. In accordance with the established criteria, the UE device evaluates the measurements and determines if the UE should select the cell transmitting on the higher priority frequency. If the measurement is above the threshold, the method continues to step 516 where the cell is selected. Otherwise, the method continues at steps 510 and 506.

Figure 6:
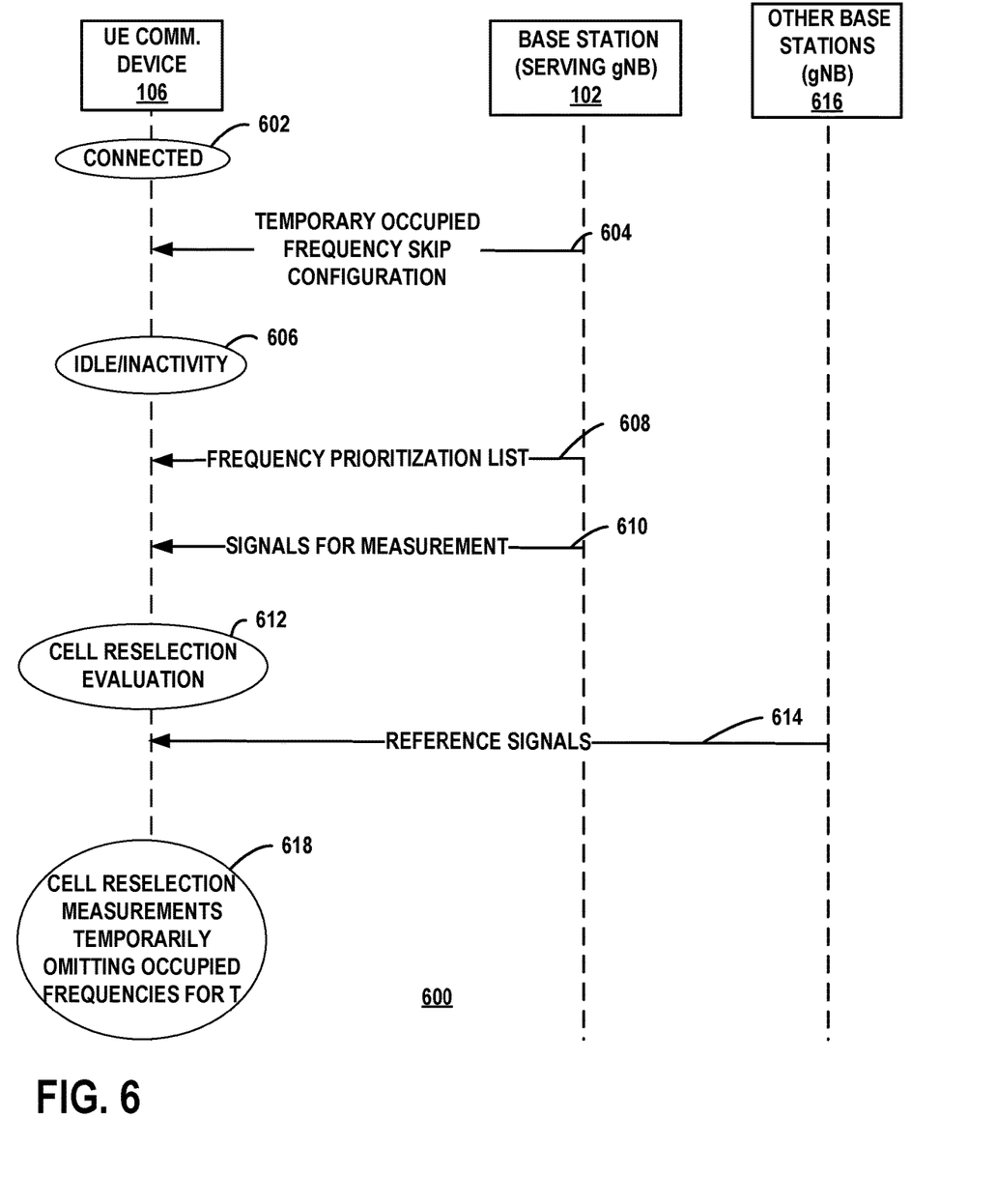
FIG. 6 is a timing diagram of communication for an example where a UE device temporarily avoids measuring occupied frequencies in a communication system utilizing unlicensed frequency bands for transmission.

FIG. 6 is a timing diagram 600 of communication for an example where a UE device temporarily avoids measuring occupied frequencies in a communication system utilizing unlicensed frequency bands for transmission. The example of FIG. 6 begins with the UE device 106 operating in the CONNECTED mode at event 602.

At transmission 604, a temporary occupied frequency skip configuration 120 is transmitted from the serving base station 102 and received at the UE device 106. For the example, the temporary occupied frequency skip configuration 120 indicates that the UE device should not attempt measuring an occupied frequency for a time period, T. For the example of FIG. 6, therefore, the UE device 106 is configured by the base station through wireless communication. In some situations, however, the UE device 106 can be preconfigured before service (e.g., hard coded with the configuration and time period). In other cases, the UE may be configured with a temporary occupied frequency skip configuration over a SIB.

At event 606, the UE transmission and operated in the IDLE/INACTIVE mode and is camped on the cell of the serving base station.

At transmission 608, the serving base station (gNB) 102 transmits a frequency prioritization list 110. The frequency prioritization list 110 identifies the frequencies and priorities the UE device should follow for cell selection/reselection. In some cases, transmission 604 may be combined with transmission 608 as one SIB message. For the example, the frequency prioritization list 110 is transmitted over a SIB in accordance with at least one revision of the 3GPP NR-U SA communication specification. In another example, the frequency prioritization list may be optionally configured to the UE via dedicated signaling (e.g., RRC Release Message) before the UE transitions to IDLE or INACTIVE.

Signals, such as reference signals (including CSI-RS) and DMRS, are evaluated for cell reselection criteria are transmitted at transmission 610 from the serving base station. The signals are evaluated by the UE device 106 at event 612 to determine if cell reselection is required. For example, the UE device may determine whether the serving cell fulfilling the Srxlev>$S_{IntraSearchP}$ and Squal>$S_{IntraSearchQ}$ requirements as well as determining whether there is a higher priority frequency provided in the frequency prioritization list and that is being used by a nearby cell.

At transmission 614, the reference signals are transmitted by nearby base stations 616. Since the reference signals are transmitted at unlicensed frequencies, the base stations perform LBT check before transmission. As a result, no reference signals are transmitted over frequencies identified by the serving base station 102 as occupied.

At event 618, the UE device 106 performs reselection measurements of frequencies not identified as occupied. Therefore, the received referenced signals are evaluated but no attempts are made to measure the frequencies identified in the occupied frequency identifier 118. If a frequency is determined to be occupied, a timer is started and no attempts are made to measure the frequency for the time period, T.

Figure 7:
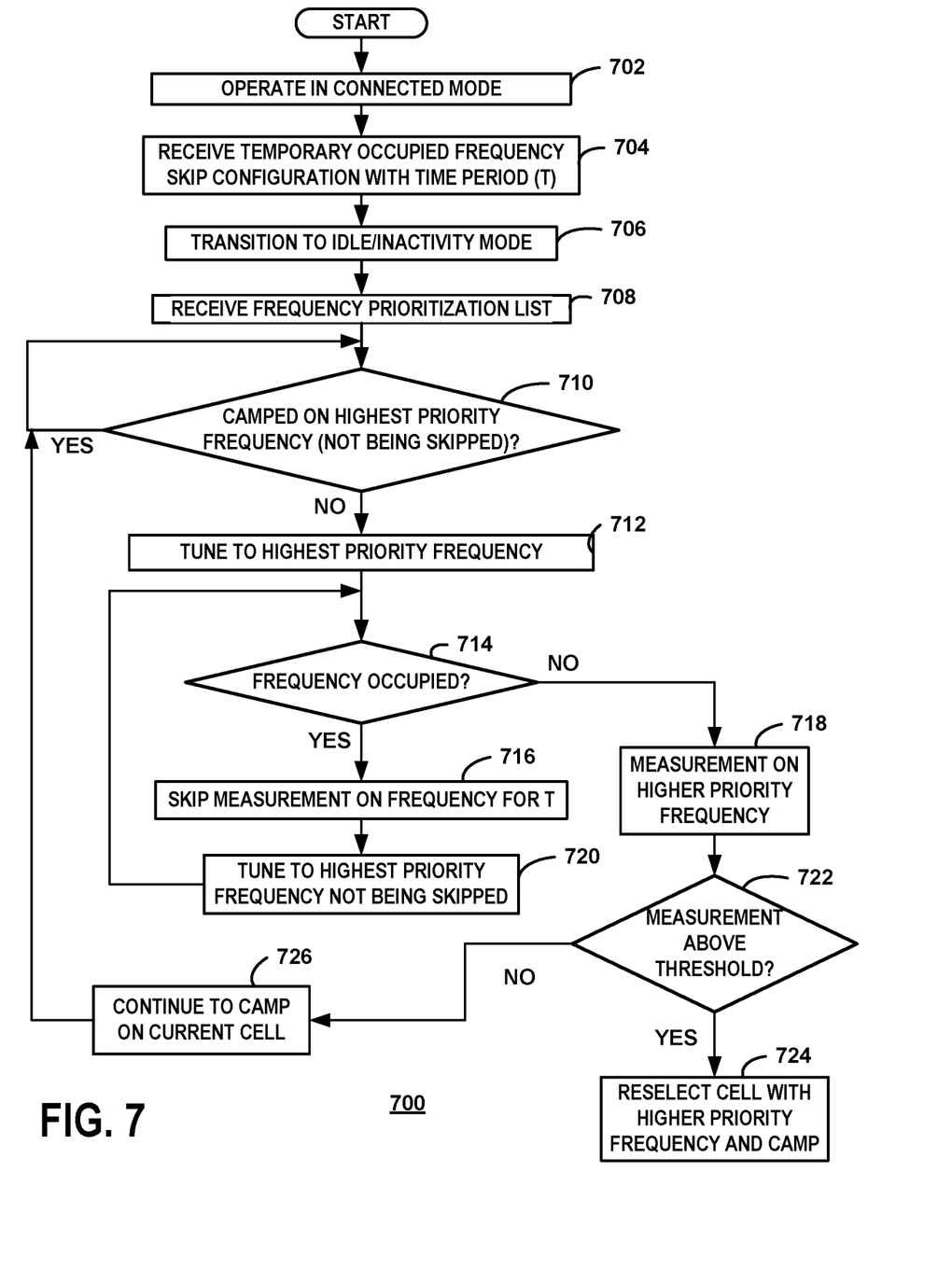
FIG. 7 is a flow chart of an example of a method of a cell reselection where the UE device temporarily avoids measuring occupied frequencies in a communication system utilizing unlicensed frequency bands for transmission.

FIG. 7 is a flow chart of an example of a method of a cell reselection where the UE device temporarily avoids measuring occupied frequencies in a communication system utilizing unlicensed frequency bands for transmission. The method is performed by a UE device operating in a NR-U SA system such as the system 100 described above. Accordingly, the method may be performed by the UE device 106.

At step 702, the UE device 106 operates in CONNECTED mode.

AT step 704, a temporary occupied frequency skip configuration 120 is received from the serving base station 102 and received at the UE device 106. For the example, the temporary occupied frequency skip configuration 120 indicates that the UE device should not attempt measuring an occupied frequency for a time period, T. For the example of FIG. 7, therefore, the UE device 106 is configured by the base station through wireless communication. In some situations, however, the UE device 106 can be preconfigured before service (e.g., hard coded with the configuration and time period). In other cases, the UE may be configured with a temporary occupied frequency skip configuration over a SIB.

At step 706, the UE device transitions and operated in the IDLE/INACTIVE mode and is camped on the cell of the serving base station.

At step 708, a frequency prioritization list 110 is received from the serving base station (gNB) 102. The frequency prioritization list 110 identifies the frequencies and priorities the UE device should follow for cell selection/reselection. For the example, the frequency prioritization list 110 is transmitted over a SIB in accordance with at least one revision of the 3GPP NR-U SA communication specification.

At step 710, it is determined whether the UE device is camped on the highest priority frequency that is not being temporarily skipped. The UE device 106 determines whether a higher priority frequency is listed in the frequency prioritization list 110 and whether the UE device is camped on the highest priority frequency in the list. If the current frequency is the highest priority, the UE device continues to receive and monitor updated frequency prioritization lists. If the current frequency is not the higher priority, the method continues at step 712.

At step 712, the UE device tunes to the highest priority frequency in the frequency prioritization list.

At step 714, the UE device determines if the frequency is occupied. For example, one or more measured energy parameters of the channel may be compared to a threshold. If the channel is occupied, the UE device continues to step 716 where a timer is started for the time period, T and the frequency is not measured until expiration of the time period. Otherwise, the method continues to step 718.

At step 720, the UE device tunes to the highest priority frequency not being temporarily skipped. Therefore, the UE device 106 tunes to the highest priority frequency in the frequency prioritization list that is not being skipped. The method then returns to 714, where it is determined whether the frequency is occupied.

At step 718, the higher priority frequency is measured. The UE device 106 evaluates parameters of the received reference signals transmitted at the higher priority frequency.

At step 722, it is determined whether the measurement is above the threshold requiring cell reselection. In accordance with the established criteria, the UE device evaluates the measurements and determines if the UE should select the cell transmitting on the higher priority frequency. If the measurement is above the threshold, the method continues to step 724 where the cell is selected. Otherwise, the method continues at step 726 where the UE device continues to camp on the current cell before returning step 710.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a user equipment (UE) device, the method comprising:
   receiving a frequency prioritization list identifying a priority of each of a plurality of unlicensed frequencies;
   receiving unlicensed frequency occupancy information from a serving base station, the unlicensed frequency occupancy information identifying an occupied unlicensed frequency in the frequency prioritization list;
   determining that the UE device is not camped on a highest priority frequency in the frequency prioritization list;
   in response to determining that the UE device is not camped on the highest priority frequency in the frequency prioritization list, identifying a higher priority frequency in the frequency prioritization list that has a higher priority than a current frequency of a current cell on which the UE device is camped, the current cell provided by the serving base station;
   determining that the higher priority frequency in the frequency prioritization list is not the occupied unlicensed frequency identified by the unlicensed frequency occupancy information; and
   in response to determining that the higher priority frequency is not the occupied unlicensed frequency, attempting to measure a reference signal transmitted at the higher priority frequency.

2. The method of claim 1, further comprising:
   reselecting a cell at the higher priority frequency in response to determining a measurement of the higher priority frequency is above a threshold.

3. The method of claim 2, further comprising:
   continuing to camp on the current cell, in response to determining the measurement of the higher priority frequency is below the threshold.

4. The method of claim 1, further comprising:
   receiving, from a serving base station, a temporary occupied frequency skip configuration indicating the time period.

5. The method of claim 4, wherein the receiving the temporary occupied frequency skip configuration is performed while the UE device is in a CONNECTED mode.

6. The method of claim 4, wherein the receiving the temporary occupied frequency skip configuration comprises receiving the temporary occupied frequency skip configuration in a System Information Block (SIB).

7. A user equipment (UE) device comprising:
a receiver configured to receive a frequency prioritization list identifying a priority of each of a plurality of unlicensed frequencies, the receiver configured to receive unlicensed frequency occupancy information from a serving base station, the unlicensed frequency occupancy information identifying an occupied unlicensed frequency in the frequency prioritization list; and
a controller configured to:
determine that the UE device is not camped on a highest priority frequency in the frequency prioritization list,
in response to determining that the UE device is not camped on the highest priority frequency in the frequency prioritization list, identify a higher priority frequency in the frequency prioritization list that has a higher priority than a current frequency of a current cell on which the UE device is camped, the current cell provided by the serving base station,
determine that the higher priority frequency in the frequency prioritization list is not the occupied unlicensed frequency identified by the unlicensed frequency occupancy information, and
in response to determining that the higher priority frequency is not the occupied unlicensed frequency, attempt to measure a reference signal transmitted at the higher priority frequency.

8. The UE device of claim 7, the controller further configured to reselect a cell at the higher priority frequency in response to determining a measurement of the higher priority frequency is above a threshold.

9. The UE device of claim 8, the controller further configured to cause the UE device to continue to camp on the current cell in response to determining the measurement of the higher priority frequency is below the threshold.

10. The UE device of claim 7, the receiver further configured to receive, from a serving base station, a temporary occupied frequency skip configuration indicating the time period.

11. The UE device of claim 10, wherein the receiver is configured to receive the temporary occupied frequency skip configuration while the UE device is in a CONNECTED mode.

12. The UE device of claim 10, wherein the receiver is configured to receive the temporary occupied frequency skip configuration in a System Information Block (SIB).

* * * * *